Patented Nov. 28, 1933

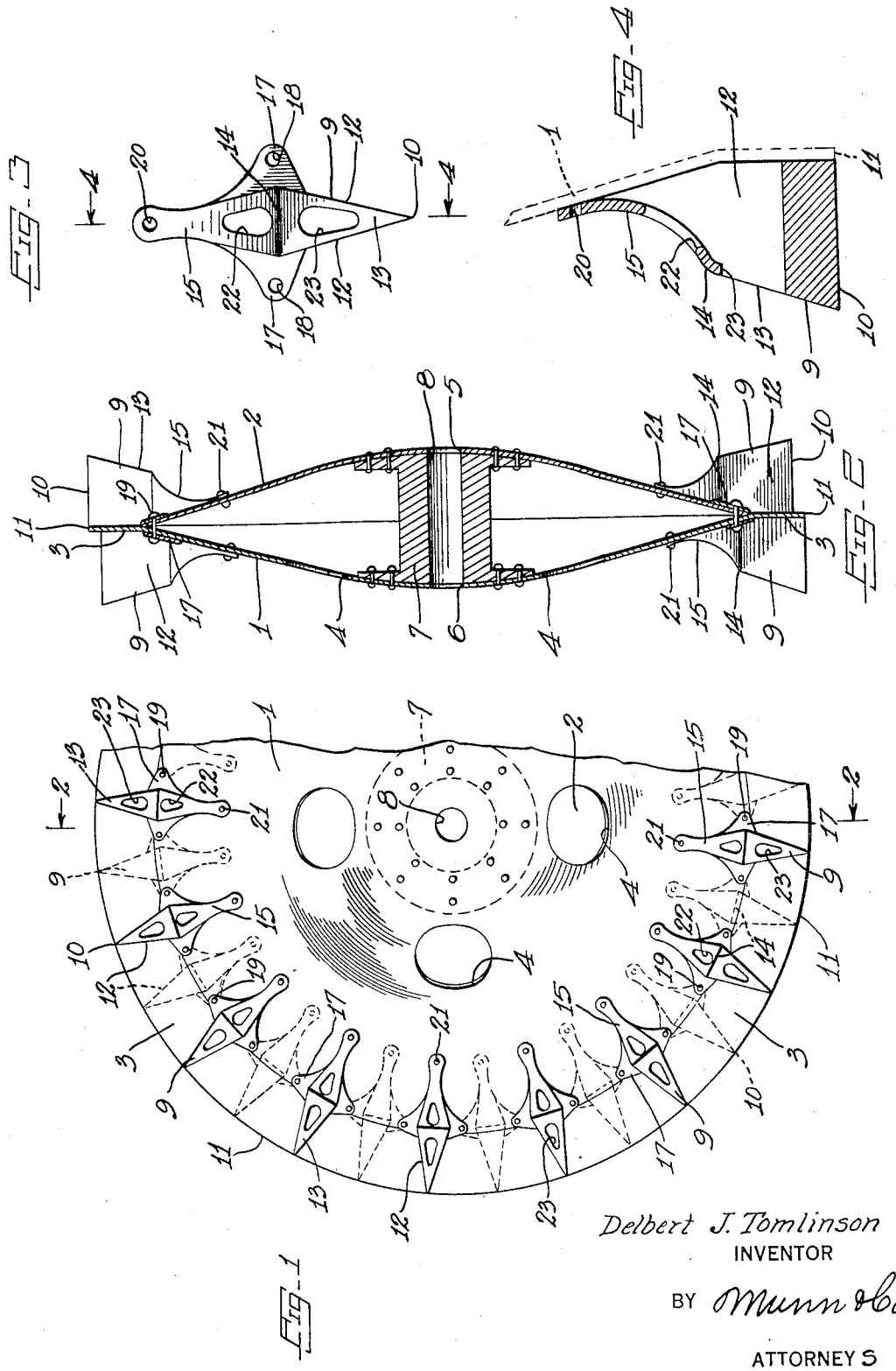

1,936,807

UNITED STATES PATENT OFFICE 1,936,807

TRACTOR WHEEL

Delbert J. Tomlinson, Geneseo, Ill.

Application August 21, 1931. Serial No. 558,571

2 Claims. (Cl. 301—43)

My invention relates to improvements in tractor wheels, and it consists in the combinations, constructions, and arrangements herein described and claimed.

An object of my invention is to provide a tractor wheel in which certain improvements are embodied over my copending application, Serial No. 312,665, granted March 1, 1932, Patent No. 1,847,280. In the application 312,665 I make use of a tractor wheel having a multiplicity of teeth extending beyond the circumferential edge of the tractor wheel. In the present invention I provide an improved construction having a plurality of teeth which are secured about the circumferential edge of the tractor wheel but which do not extend beyond the edge of that wheel.

A further object of my invention is to provide a device of the type described which has novel means for loosening the ground instead of packing the ground as is common in the ordinary type of tractor.

A further object of my invention is to provide a device of the type described in which positive traction is maintained at all time.

A further object of my invention is to provide a tractor wheel which is so constructed that soil is prevented from assembling thereupon as is common with the ordinary type of tractor wheel.

A further object of my invention is to provide a device of the type described in which the outer edge of the teeth coact with the circumferential edge of the tractor wheel in a manner adapted to secure the maximum amount of traction possible and at the same time dislodge any soil or debris which may come in contact with the wheel.

Other objects and advantages will appear in the following specification, and the novel features of the invention will be particularly pointed out in the appended claims.

My invention is illustrated in the accompanying drawing, forming part of this application, in which Figure 1 is a fractional side elevation of the tractor wheel, Figure 2 is a vertical section of the tractor wheel shown in Figure 1, taken along the line 2—2 of Figure 1, Figure 3 is an enlarged front elevational view of one of the tractor wheel teeth shown in Figure 1, and Figure 4 is a section taken along the line 4—4 of Figure 3.

In carrying out my invention, I make use of a relatively large disc 1 and a small disc 2. The large disc 1 is provided with an annular flange 3 at the periphery thereof. The disc 1 may be provided with openings 4 in order that access may be had to the interior of the wheel for the purpose of riveting various portions of the wheel together. These openings may be provided with any suitatble covers, not shown. The discs 1 and 2 are provided with central openings 5 and 6, respectively. A hub 7 is disposed between the discs in such a manner that the bore 8 of the hub is aligned with the central openings 5 and 6. The periphery of the wheel 2 may be secured to the disc 1 in any suitable manner, such as by welding or riveting. The hub 7 may likewise be secured to the discs 1 and 2.

A multiplicity of hollow teeth 9 is provided which have cutting edges 10. The edges of the teeth 9 are so positioned as to be aligned with the circumferential edge 11 of my tractor wheel. The teeth 9 are also provided with supporting walls 12 which extend outwardly in transverse directions, forming a cutting portion V-shaped in longitudinal section. The walls 13 may extend inwardly from the more or less centrally disposed edges 14.

An inner curved wall 15 is integral with the walls 13. A flange 17 is provided on each side of the central portion of the tooth 9, and it has an opening 18 by which the tooth 9 may be secured to the discs 1 and 2 by any suitable means, such as rivets 19. The teeth are also provided with openings 20 in their inner portions and rivets 21 by which the inner portions of the teeth may be secured to the disc. The tooth may also be provided with openings 22 and 23.

From the foregoing description of the various parts of the device, the operation thereof may be readily understood. In the rotation of the wheels upon the axles of a tractor (not shown), positive traction is assured, in that only the edges 10, the walls 12 of the teeth, and the flange 3 of the wheel engage with the ground. It will be observed that the cutting edge 10 and the adjacent portion of the circumferential edge 11 are joined evenly together in such a manner that no corners are provided in which the dirt may collect. While it is true that soil may collect on the walls 13 of the teeth, the openings 22 and 23 reduce the exposed area of the teeth and at the same time, by reason of the teeth being hollow, provide a passageway through which the soil may pass.

Attention is directed to the fact that the teeth are alternately disposed on the two sides of the circumferential edge of the wheel. This arrangement has the advantage of having the teeth spaced well part—thus preventing the possibility of wet dirt from forming an arch or bridge between the teeth. It will also be observed that the walls 13 incline axially and radially outwardly toward the edges 10. It will also be observed that the walls 12 extend radially outwardly and come to a point at the cutting edge 10. The tapered supporting walls 12 provide supporting surfaces for the wheel, to prevent the wheel's sinking in soft places as the tractor passes over the ground. These surfaces tend to extend horizontally after each tooth has been moved past the vertical position in engagement with the ground. In this manner, flat supporting surfaces are provided to prevent the wheel from sinking into muddy spots.

I have found by repeated experiment that the best results are obtained when the cutting edge of the teeth are joined evenly with the circumferential edge of the wheel. In addition to the before-mentioned advantage of providing no corners in which the dirt may accumulate, this construction aids in breaking or cutting clods, turf, debris, and the like, into small sections; this of course facilitates plowing.

I claim:

1. In a tractor wheel, a lug comprising a wedge shaped soil engaging portion having an end wall provided with an opening, a concave wall extending from said end wall to the inner end of the lug, said concave wall having an opening therein, a chamber in said lug providing a passageway from said first mentioned opening to said second mentioned opening, and means for securing said lug to a wheel.

2. In a tractor wheel, a lug having front and rear walls each provided with means at the inner edges thereof for securing the lug to a wheel adjacent the periphery thereof, the outer portions of said walls converging to define a soil entering edge, an end wall having its outer portion of triangular formation and integral with said converging walls and being inclined from said edge toward the opposite end of the lug, the inner portions of said front and rear walls converging in a direction opposite to that in which the outer portions of these walls converge, the inner portion of said end wall being concave and merging into said converging inner portions of said front and rear walls to form an additional securing means, and a chamber in said lug, said triangular and curved portions of said end wall having passages through the same communicating with said chamber.

DELBERT J. TOMLINSON.